United States Patent
Hwang

(10) Patent No.: US 9,600,756 B1
(45) Date of Patent: Mar. 21, 2017

(54) WIRELESS INPUT DEVICE WITHOUT INTERNAL POWER SUPPLY

(71) Applicants: Richard Hwang, New Taipei (TW); Memiee L. Hwang, West Linn, OR (US)

(72) Inventor: Richard Hwang, New Taipei (TW)

(73) Assignees: Richard Hwang (TW); Memiee L. Hwang, West Linn, OR (US)

( * ) Notice: Subject to any disclaimer, the term of this patent is extended or adjusted under 35 U.S.C. 154(b) by 0 days.

(21) Appl. No.: 14/877,746

(22) Filed: Oct. 7, 2015

(51) Int. Cl.
  *G06K 19/077* (2006.01)
  *G06F 3/023* (2006.01)

(52) U.S. Cl.
  CPC ..... *G06K 19/07728* (2013.01); *G06F 3/0231* (2013.01); *G06K 19/07775* (2013.01)

(58) Field of Classification Search
  CPC ........ G06K 19/07728; G06K 19/07775; G06F 3/0231; G06F 3/0202
  See application file for complete search history.

(56) References Cited

U.S. PATENT DOCUMENTS

2006/0202868 A1* 9/2006 Henty .................. G06F 3/0202
  341/22

* cited by examiner

Primary Examiner — Kristy A Haupt

(57) ABSTRACT

A wireless input device comprises a plurality of RFID tag units and keys. Each RFID tag unit is coupled with two conductive wires. Only when the two conductive wires are in a closed-loop status, the RFID tag unit can generate a responsive RF signal corresponding to a scanning signal generated by a host device. Each key is formed with a switching mechanism connectable to the conductive wires of at least one of the RFID tag units. When any one of the keys is pressed, the conductive wires connectable to the pressed key will be switched to the closed-loop status from an open-loop status, and when that pressed key is released, the conductive wires connectable to the released key will be switched back to said open-loop status. Therefore, the wireless input device can be operated without the need of internal electric power.

9 Claims, 6 Drawing Sheets

FIG.2

WIRELESS INPUT DEVICE WITHOUT INTERNAL POWER SUPPLY

BACKGROUND OF INVENTION

1. Field of the Invention

The invention relates to a wireless input device, especially refers to a keyboard furnished with a plurality of RFID (Radio Frequency Identification) tag units that can be operated without the need of internal electric power.

2. Description of the Prior Art

Conventional input devices such as keyboards for computers, include cabled keyboards and wireless keyboards. The cabled keyboard is connected with the computer via a cable and thus can acquire electric power from the computer for operations. However, for those conventional wireless keyboards, batteries are required to be built inside the wireless keyboards in order to provide electric powers for operations. Almost all users of the wireless keyboards have been experienced the same inconvenience that, when the power of the battery is getting low, lost or error signals will happen frequently when operating the wireless keyboards. Not only the need to change batteries frequently is a significant drawback of the conventional wireless keyboards, but also the battery itself will cause the size and weight of wireless keyboard bulky. Situation might become even worse, when the user cannot find any new battery to replace the old one, when he/she found that his/her wireless keyboard is out of power.

SUMMARY OF THE INVENTION

Accordingly, it is the primary object of the present invention to provide a wireless input device without internal power supply, which refers to a wireless keyboard furnished with a plurality of RFID (Radio Frequency Identification) tag units that can be operated without the need of internal electric power.

In one embodiment of the present invention, the wireless input device without internal power supply comprises:

a plurality of RFID tag units, each said RFID tag unit being coupled with at least two conductive wires respectively; wherein, only when said at least two conductive wires are in a closed-loop status, said RFID tag unit is capable of generating a responsive RF (Radio Frequency) signal corresponding to a scanning signal generated by an external host device; wherein, the responsive RF signal generated by each said RFID tag unit is unique and is different from other responsive RF signals generated by other RFID tag units; and a plurality of keys, each said key being formed with a switching mechanism connectable to said conductive wires of at least one of said RFID tag units; wherein, when any one of the keys is pressed, the conductive wires connectable to said pressed key will be switched to said closed-loop status from an open-loop status, and when that pressed key is released, the conductive wires connectable to said released key will be switched back to said open-loop status.

In a preferred embodiment of the present invention, the external host device is equipped with a RF transceiver capable of sending the scanning signal and receiving the responsive RF signals generated by said RFID tag units.

In a preferred embodiment of the present invention, the wireless input device is a keyboard, wherein the external host device is one of the following: personal computer, notebook computer, tablet computer, and smart phone.

In a preferred embodiment of the present invention, the RF transceiver is in a form of a dongle which can be plugged to a receptacle of the external host device; wherein the receptacle matches one of the following interfaces: USB, mini-USB, micro-USB, Apple Lighting USB, ISA, PCI, and PCI-E.

In a preferred embodiment of the present invention, the RF transceiver is built-in the external host device.

In a preferred embodiment of the present invention, when one of said keys is pressed, the conductive wires of at least two different RFID tag units will be switched to said closed-loop status.

In a preferred embodiment of the present invention, the keys are substantially arranged in a form of an array having "n" columns and "m" rows, such that said keys can be named according to their positions in the array as KEY(1,1), KEY(1,2), KEY(1,3), . . . KEY(1,n), KEY(2,1), KEY(2,2), KEY(2,3), . . . K(m,n), respectively;

wherein both m and n are integral; wherein the RFID tag units comprises "n" number of column-tags which can be named as TAG(X1), TAG(X2), TAG(X3), . . . , TAG(Xn) respectively and "m" number of row-tags which can be named as TAG(Y1), TAG(Y2), TAG(Y3), . . . , TAG(Ym) respectively;

wherein, the two conductive wires of each one of said column-tags are connectable to all of the keys belong to the same column, that is, the two conductive wires of TAG(X1) are connectable to the KEY(1,1), KEY(2,1), KEY(3,1), . . . and KEY(m,1);

wherein, the two conductive wires of each one of said row-tags are connectable to all of the keys belong to the same row, that is, the two conductive wires of TAG(Y1) is connectable to the KEY(1,1), KEY(1,2), KEY(1,3), . . . and KEY(1,n).

In a preferred embodiment of the present invention, each said key comprises two switching mechanisms which respectively connectable to said two conductive wires of one said column-tag belong to the same column as the key and said two conductive wires of one said row-tag belong to the same row as the key.

In a preferred embodiment of the present invention, each one of said conductive wires of the same RFID tag unit includes a plurality of sub-wires extending out from the conductive wire and are substantially perpendicular to the conductive wire which they extended; wherein each one of said sub-wire of one said conductive wire of the RFID tag unit is neighbor and parallel to another sub-wire of another said conductive wire of the same RFID tag unit; wherein said switching mechanism of said key comprises a conductive layer which is away from the sub-wires when said key is not pressed; when the key is pressed, the conductive layer contacts the sub-wires and thus switches the conductive wires of the RFID tag unit to the closed-loop status.

In a preferred embodiment of the present invention, the wireless input device comprises:

a substrate, mounted with the RFID tag units and formed with the conductive wires;

an upper membrane, located above and spaced from the substrate, at least one conductive layer is formed on a surface of the upper membrane facing and corresponding to the conductive wires; and an isolation membrane, located between the substrate and the upper membrane; wherein the isolation membrane is formed with a plurality of through openings and ribs; when a portion of the upper membrane is pressed, the conductive layer corresponding to the pressed portion will pass through one of the through openings and contact with the conductive wires so as to made the contacted conductive wires closed-looped; wherein the ribs can prevent the conductive layer from contacting the conductive wires when the portion of the upper membrane is not pressed, so as to keep the conductive wires open-looped.

In a preferred embodiment of the present invention, each said RFID tag units comprises a RFID IC chip and an antenna; wherein the RFID IC chip includes at least two terminals, wherein one said terminal is coupled to one said conductive wire; another said terminal is coupled to one end of the antenna; and, another end of the antenna is coupled to another said conductive wire.

All these objects are achieved by the wireless input device without internal power supply described below.

BRIEF DESCRIPTION OF THE DRAWINGS

The present invention will now be specified with reference to its preferred embodiment illustrated in the drawings, in which:

FIG. 2 schematically shows an arrangement of a plurality of keys and RFID tag units in accordance with a preferred embodiment of the present invention;

DESCRIPTION OF THE PREFERRED EMBODIMENT

The invention disclosed herein is directed to a wireless input device without internal power supply, especially refers to a wireless keyboard furnished with a plurality of RFID tag units that can be operated without the need of internal electric power.

Figure 1:
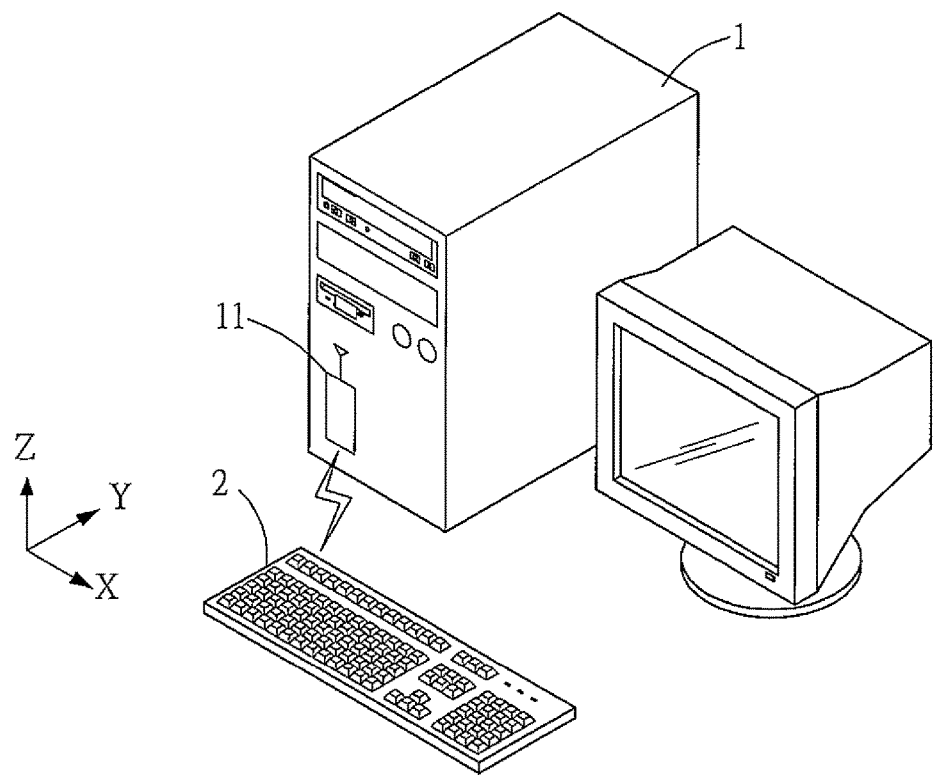
FIG. 1 schematically shows a host device and a wireless input device without internal power supply in accordance with the present invention.

Please refer to FIG. 1, which schematically shows an external host device 1 and a wireless input device 2 in accordance with the present invention. The wireless input device 2 is typically a wireless keyboard or a wireless keypad located near to but not contact with the host device 1. By operating the wireless input device 2, that means, by pressing the keys located on the upper surface of wireless input device 2, operating signals will be generated by the wireless input device 2 and received by a RF transceiver 11 of the host device 1, so as to control the host device 1 to perform desired functions.

In one embodiment of the present invention, the host device 1 is one of the following: personal computer, notebook computer, tablet computer, smart TV, display, and smart phone. The RF transceiver 11 equipped by the host device 1 is a RFID transceiver capable of sending the RFID scanning signals and also capable of receiving the responsive RF signals generated by the RFID tag units furnished inside the wireless input device 2. In a preferred embodiment of the present invention, the RF transceiver 11 is in a form of a dongle which can be plugged to (or unplugged from) a receptacle of the host device 1. Wherein, both the dongle of RF transceiver 11 and the receptacle of host device 1 match one of the following interfaces: USB, mini-USB, micro-USB, Apple Lighting USB, ISA, PCI, and PCI-E. By plugging the RF transceiver 11 to the receptacle of host device 1 and executing a specific application on the host device 1, the host device 1 will be capable of scanning and receiving RFID signals. However, in another embodiment of the present invention, the RF transceiver 11 can also be a built-in component of the host device 1.

Figure 2:
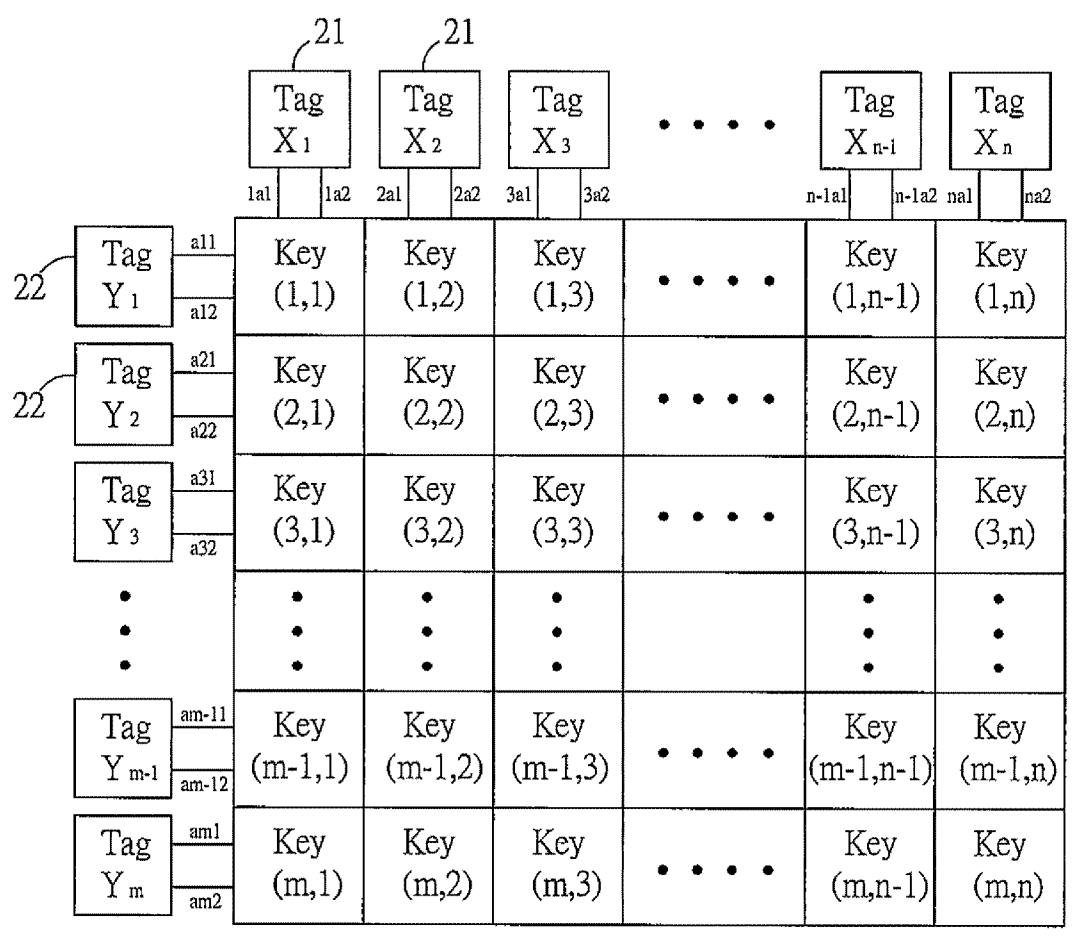
Figure 3:
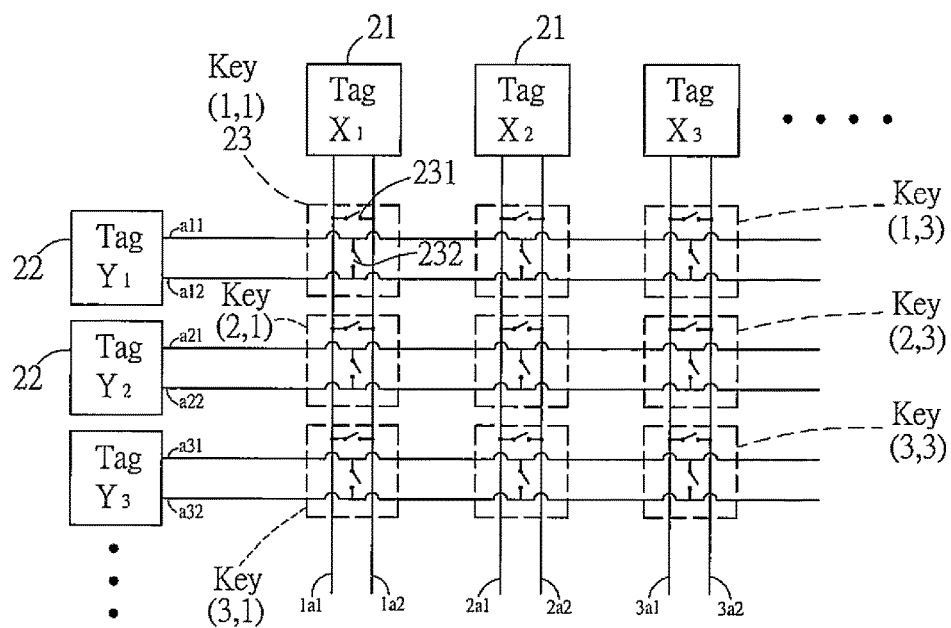
FIG. 3 schematically shows a preferred embodiment of the switching mechanism formed inside the key in accordance with the present invention.

Please refer to FIG. 2 and FIG. 3. FIG. 2 schematically shows an arrangement of a plurality of keys and RFID tag units in accordance with a preferred embodiment of the present invention. FIG. 3 schematically shows a preferred embodiment of the switching mechanism formed inside the key 23 in accordance with the present invention. In a preferred embodiment of the present invention, the wireless input device 2 without internal power supply comprises a plurality of RFID tag units 21, 22 and a plurality of keys 23. Each RFID tag unit 21, 22 being coupled with at least two conductive wires 1a1, 1a2, a11, a12 respectively. Taking the top-left ones as examples, the RFID tag unit 21 "TAG(X1)" is coupled with two conductive wires 1a1, 1a2, while another RFID tag unit 22 "TAG(Y1)" is coupled with another two conductive wires a11, a12. Only when any set of two conductive wires 1a1, 1a2 (or a11, a12) are in a closed-loop status, the RFID tag unit 21 (or 22) is capable of generating a responsive RF signal corresponding to a scanning signal generated by the RF transceiver 11 of the host device 1, without the need of additional power supply. Therefore, the wireless input device 2 can be operated without the need of internal power supply such as batteries and so on. Preferably, the responsive RF signal generated by each RFID tag unit 21 (or 22) is unique, is containing the ID information of the tag itself, and is different from other responsive RF signals generated by other RFID tag units 21 (or 22).

In a preferred embodiment of the present invention, each key 23 is formed with at least one switching mechanism 231, 232 connectable to the set of two conductive wires 1a1, 1a2 (or a11, a12) of at least one of the RFID tag units 21 (or 22). When any one of the keys 23 is pressed, the conductive wires 1a1, 1a2 (or a11, a12) connectable to the pressed key 23 will be switched to the closed-loop status from an open-loop status, and when that pressed key 23 is released, the set of conductive wires 1a1, 1a2 (or a11, a12) connectable to the released key 23 will be switched back to the open-loop status.

As shown in FIG. 2 and FIG. 3, the keys 23 are substantially arranged in a form of an array having "n" columns and "m" rows, such that the keys 23 can be named according to their positions in the array as KEY(1,1), KEY(1,2), KEY(1,3), . . . KEY(1,n−1), KEY(1,n); KEY(2,1), KEY(2,2), KEY(2,3), . . . KEY(2,n−1), KEY(2,n); KEY(3,1), KEY(3,2), KEY(3,3), . . . KEY(3,n−1), KEY(3,n); . . . ; KEY(m−1,1), KEY(m−1,2), KEY(m−1,3), . . . KEY(m−1,n−1), KEY(m−1,n), KEY(m,1), KEY(m,2), KEY(m,3), . . . KEY(m,n−1), KEY(m,n), respectively, wherein both m and n are integral. In this embodiment, the RFID tag units 21, 22 comprises "n" number of column-tags 21 which can be named as TAG(X1), TAG(X2), TAG(X3), . . . , TAG(Xn−1), TAG(Xn) respectively and "m" number of row-tags 22 which can be named as TAG(Y1), TAG(Y2), TAG(Y3), . . . , TAG(Ym−1), TAG(Ym) respectively.

The two conductive wires of each one of the column-tags 21 are connectable to all of the keys 23 belong to the same column, that is, the two conductive wires 1a1, 1a2 of TAG(X1) are connectable to the KEY(1,1), KEY(2,1), KEY(3,1), ..., KEY(m-1,1) and KEY(m,1); while another two conductive wires 2a1, 2a2 of TAG(X2) are connectable to the KEY(1,2), KEY(2,2), KEY(3,2), ..., KEY(m-1,2) and KEY(m,2), and so on. Similarly, the two conductive wires of each one of the row-tags 22 are connectable to all of the keys 23 belong to the same row, that is, the two conductive wires a11, a12 of TAG(Y1) is connectable to the KEY(1,1), KEY(1,2), KEY(1,3), ..., KEY(1,n-1) and KEY(1,n); while another two conductive wires a21, a22 of TAG(Y2) is connectable to the KEY(2,1), KEY(2,2), KEY(2,3), ..., KEY(2,n-1) and KEY(2,n), and so on.

Please refer to FIG. 3, in a preferred embodiment of the present invention, each key 23 comprises two switching mechanisms 231, 232 which respectively connectable to a set of two conductive wires (for example, conductive wires 1a1, 1a2) of one column-tag 21 (for example, TAG(X1)) belong to the same column as the key 23 (for example, KEY(1,1)) and another set of two conductive wires (for example, conductive wires a11, a12) of one row-tag 22 (for example, TAG(Y1)) belong to the same row as the key 23 (KEY(1,1)). When the switching mechanism 231 is activated by pressing the key 23 (KEY(1,1)), the switching mechanism 231 becomes a closed-loop between the set of conductive wires 1a1, 1a2 for the column-tag 21 (TAG(X1)), and in the mean time, another switching mechanism 232 will also be activated due to the pressed key 23 (KEY(1,1)), such that the other switching mechanism 232 also becomes a closed-loop between another set of conductive wires a11, a12 for the row-tag 22 (TAG(Y1)). Therefore, it can be clearly understood that, when one of the keys 23 is pressed, the conductive wires of at least two different RFID tag units 21, 22 will be switched to the closed-loop status for generating responsive RF signals. The RF transceiver 11 of the host device 1 can scan, receive and analyze the responsive RF signals generated by the RFID tag units 21, 22, such that the host device 1 can find out which one of the keys 23 was pressed, and thus perform the function corresponding to the pressed key 23.

Figure 4:
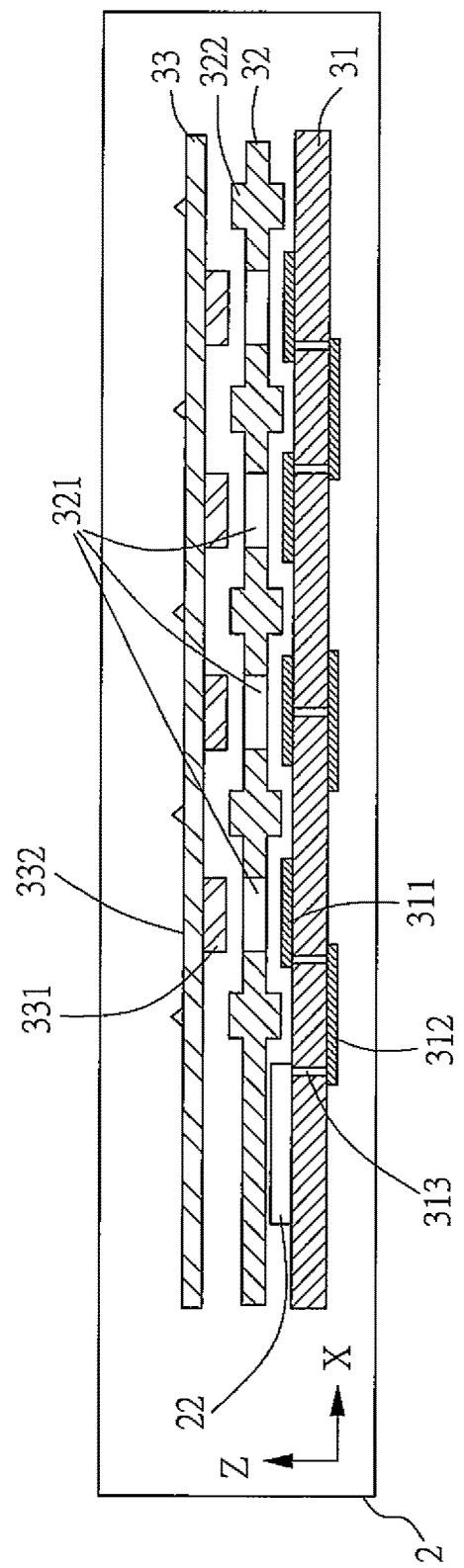
FIG. 4 schematically shows a cross-sectional view of a preferred embodiment of the wireless input device in accordance with the present invention.

Please refer to FIG. 4, which schematically shows a cross-sectional view of a preferred embodiment of the wireless input device 1 in accordance with the present invention.

In a preferred embodiment of the present invention, the wireless input device 1 is a wireless membrane keyboard comprising: a substrate 31, an isolation membrane 32 and an upper membrane 33. The substrate 31 is a flexible PCB which is mounted with the RFID tag units 21, 22 and is formed with the circuits of conductive wires coupling to the RFID tag units 21, 22. In a preferred embodiment, the substrate 31 is formed with at least an upper metal wire 311 and a lower metal wire 312 with two opposite surfaces of the substrate 31, and the substrate 31 is further formed with a plurality of via 313 for connecting the upper and lower metal wires 311, 312. The upper membrane 33 is located above and spaced from the substrate 31. At least one conductive layer 331 is formed on a surface of the upper membrane 33 facing and corresponding to the conductive wires, especially the upper metal wire 311, of the substrate 31. The isolation membrane 32 is located between the substrate 31 and the upper membrane 33. The isolation membrane 32 is formed with a plurality of through openings 321 and ribs 322. When a portion of the upper membrane 33 is pressed, the conductive layer 331 corresponding to the pressed portion will pass through one of the through openings 321 and contact with the conductive wires (e.g., the upper metal wire 311) so as to made the contacted conductive wires closed-looped.

Wherein, the ribs 322 can prevent the conductive layer 331 from contacting the conductive wires (e.g., the upper metal wire 311) when the portion of the upper membrane 33 is not pressed, so as to keep the conductive wires open-looped. Although the present invention discloses a structure of membrane keyboard to act as the wireless input device 2 of the present invention, however, it is noted that other kind of conventional mechanical keyboards can also be employed in the present invention.

Figure 5:
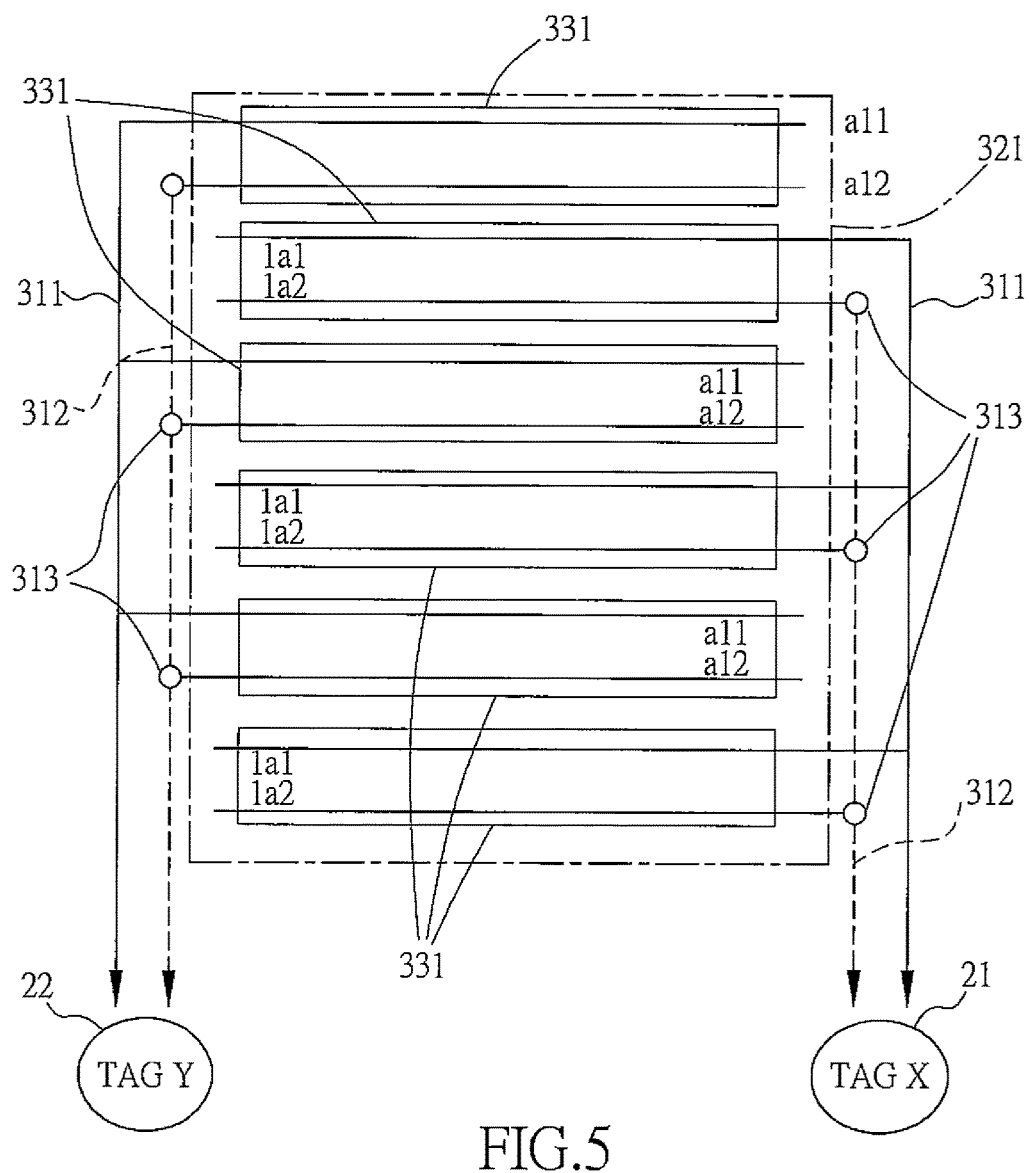
FIG. 5 schematically shows an embodiment of the layout of the conductive lines and conductive layer of the wireless input device in accordance with the present invention.

Please refer to FIG. 5, which schematically shows an embodiment of the layout of the metal wires 311, 312 and conductive layer 311 of the wireless input device as shown in FIG. 4. In a preferred embodiment of the present invention, each one set of the two conductive wires 1a1, 1a2 (or a11, a12) of the same RFID tag unit such like "TAG(X1)" (or TAG(Y1)) includes a plurality of sub-wires extending out from the conductive wire and are substantially perpendicular to the conductive wire which they extended. For example, the upper metal wires 311 formed on the upper surface of substrate 31 (please also refer to FIG. 4) are presented by solid straight lines that include the conductive wires 1a1 and a11 and their sub-wires 1a1 and a11. The other sub-wires 1a2 and a12 presented by solid lines are also included by the upper metal wires 311 formed on the upper surface of substrate 31. However, the other conductive wires 1a2 and a12 which are presented by dotted lines are included in the lower metal wires 312 formed on the bottom surface of substrate 31. A plurality of conductive via 313 are formed at the intersection points of the solid-lined sub-wires 1a2 and a12 and dotted-lined conductive wires 1a2 and a12. Each one of the sub-wire of one conductive wire of the RFID tag unit is neighbor and parallel to another sub-wire of another conductive wire of the same RFID tag unit. Wherein, the aforementioned switching mechanism of the key 23 comprises a conductive layer 331 which is away from the sub-wires when the key 23 is not pressed; when the key 23 is pressed, the conductive layer 331 contacts the sub-wires and thus switches the conductive wires of the RFID tag unit to the closed-loop status. Because each conductive wire is extended with a plurality of sub-wires, thus the contact between the conductive layer 331 and the sub-wires can be ensured no matter which part of the key is pressed.

Figure 6:
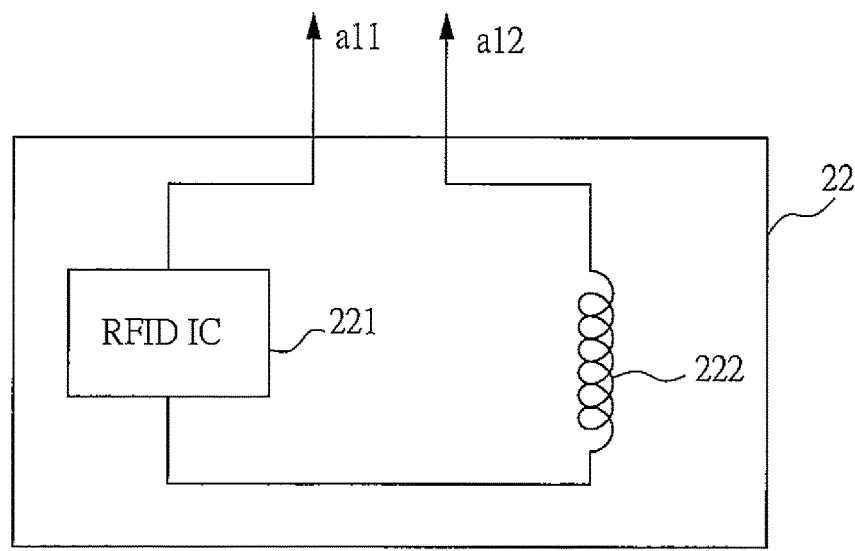
FIG. 6 schematically shows a block diagram of the RFID tag unit in accordance with the present invention.

Please refer to FIG. 6, which schematically shows a block diagram of the RFID tag unit in accordance with the present invention. In a preferred embodiment of the present invention, each said RFID tag units 21, 22 comprises a RFID IC chip 221 and an antenna 222. The RFID IC chip 221 includes at least two terminals. Wherein, one terminal is coupled to one conductive wire a11, while another terminal is coupled to one end of the antenna 222. In addition, another end of the antenna 222 is coupled to another conductive wire a12. Because the structure and feature of the RFID IC chip 221 is well known in the art, thus no detailed description is provided herewith; for example, U.S. Pat. No. 5,608,417 disclosed a circuitry of conventional RFID IC chip which can be employed in the present invention.

While the present invention has been particularly shown and described with reference to a preferred embodiment, it will be understood by those skilled in the art that various changes in form and detail may be without departing from the spirit and scope of the present invention.

What is claimed is:

1. A wireless input device without internal power supply comprising:
   a plurality of RFID tag units, each said RFID tag unit being coupled with at least two conductive wires respectively; wherein, only when said at least two conductive wires are in a closed-loop status, said RFID tag unit is capable of generating a responsive RF signal corresponding to a scanning signal generated by an external host device; wherein, the responsive RF signal generated by each said RFID tag unit is unique and is different from other responsive RF signals generated by other RFID tag units; and a plurality of keys, each said key being formed with a switching mechanism connectable to said conductive wires of at least one of said RFID tag units; wherein, when any one of the keys is pressed, the conductive wires connectable to said pressed key will be switched to said closed-loop status from an open-loop status, and when that pressed key is released, the conductive wires connectable to said released key will be switched back to said open-loop status;

wherein the keys are substantially arranged in a form of an array having "n" columns and "m" rows, such that said keys can be named according to their positions in the array as KEY(1,1), KEY(1,2), KEY(1,3), . . . KEY(1,n), KEY(2,1), KEY(2,2), KEY(2,3), . . . K(m, n), respectively;

wherein both m and n are integral; wherein the RFID tag units comprises "n" number of column-tags which can be named as TAG(X1), TAG(X2), TAG(X3), . . . TAG(Xn) respectively and "m" number of row-tags which can be named as TAG(Y1), TAG(Y2), TAG(Y3), . . . , TAG(Ym) respectively;

wherein, the two conductive wires of each one of said column-tags are connectable to all of the keys belong to the same column, that is, the two conductive wires of TAG(X1) are connectable to the KEY(1,1), KEY(2,1), KEY(3,1), . . . and KEY(m,1);

wherein, the two conductive wires of each one of said row-tags are connectable to all of the keys belong to the same row, that is, the two conductive wires of TAG(Y1) is connectable to the KEY(1,1), KEY(1,2), KEY(1,3), . . . and KEY(1,n);

wherein when one of said keys is pressed, the conductive wires of at least two different RFID tag units will be switched to said closed-loop status; that is, when any one of said keys is pressed, the switching mechanism of said pressed key becomes a closed-loop between the set of conductive wires of the column-tag which is belong to the same column as the pressed key, in addition, the switching mechanism of said pressed key also becomes a closed-loop between the set of conductive wires of the row-tag which is belong to the same row as the pressed key.

2. The wireless input device without internal power supply according to claim 1, wherein the host device is equipped with a RF transceiver capable of sending the scanning signal and receiving the responsive RF signals generated by said RFID tag units.

3. The wireless input device without internal power supply according to claim 2, wherein the wireless input device is a keyboard; wherein the host device is one of the following: personal computer, notebook computer, tablet computer, and smart phone.

4. The wireless input device without internal power supply according to claim 2, wherein the RF transceiver is in a form of a dongle which can be plugged to a receptacle of the host device; wherein the receptacle matches one of the following interfaces: USB, mini-USB, micro-USB, Apple Lighting USB, ISA, PCI, and PCI-E.

5. The wireless input device without internal power supply according to claim 2, wherein the RF transceiver is built-in the host device.

6. The wireless input device without internal power supply according to claim 1, wherein each said key comprises two switching mechanisms which respectively connectable to said two conductive wires of one said column-tag belong to the same column as the key and said two conductive wires of one said row-tag belong to the same row as the key.

7. The wireless input device without internal power supply according to claim 6, wherein each one of said conductive wires of the same RFID tag unit includes a plurality of sub-wires extending out from the conductive wire and are substantially perpendicular to the conductive wire which they extended; wherein each one of said sub-wire of one said conductive wire of the RFID tag unit is neighbor and parallel to another sub-wire of another said conductive wire of the same RFID tag unit; wherein said switching mechanism of said key comprises a conductive layer which is away from the sub-wires when said key is not pressed; when the key is pressed, the conductive layer contacts the sub-wires and thus switches the conductive wires of the RFID tag unit to the closed-loop status.

8. The wireless input device without internal power supply according to claim 1, wherein the wireless input device comprises:

a substrate, mounted with the RFID tag units and formed with the conductive wires;

an upper membrane, located above and spaced from the substrate, at least one conductive layer is formed on a surface of the upper membrane facing and corresponding to the conductive wires; and an isolation membrane, located between the substrate and the upper membrane; wherein the isolation membrane is formed with a plurality of through openings and ribs; when a portion of the upper membrane is pressed, the conductive layer corresponding to the pressed portion will pass through one of the through openings and contact with the conductive wires so as to made the contacted conductive wires closed-looped; wherein the ribs can prevent the conductive layer from contacting the conductive wires when the portion of the upper membrane is not pressed, so as to keep the conductive wires open-looped.

9. The wireless input device without internal power supply according to claim 1, wherein each said RFID tag units comprises a RFID IC chip and an antenna; wherein the RFID IC chip includes at least two terminals, wherein one said terminal is coupled to one said conductive wire; another said terminal is coupled to one end of the antenna; and, another end of the antenna is coupled to another said conductive wire.

* * * * *